May 11, 1937.  C. S. GLENNY  2,079,851
BICYCLE BASKET
Filed Feb. 17, 1936  2 Sheets-Sheet 1
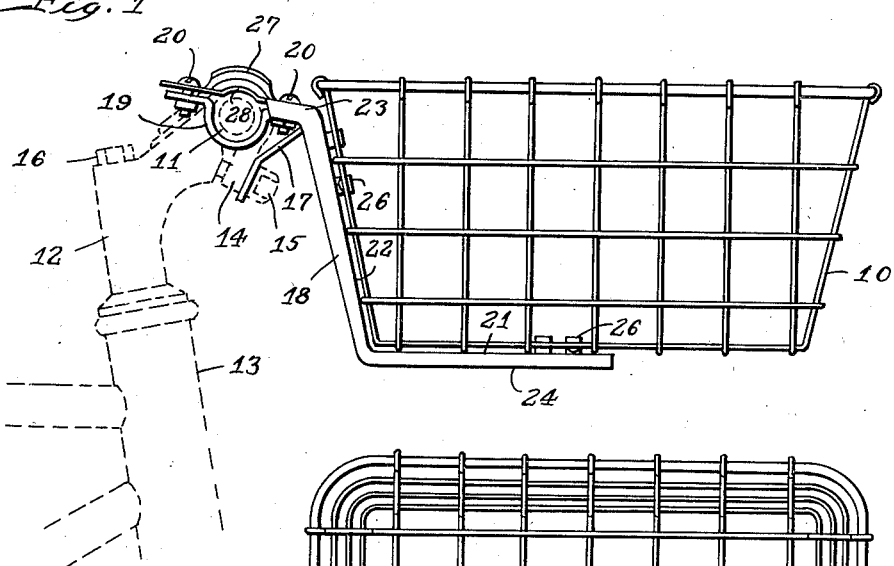
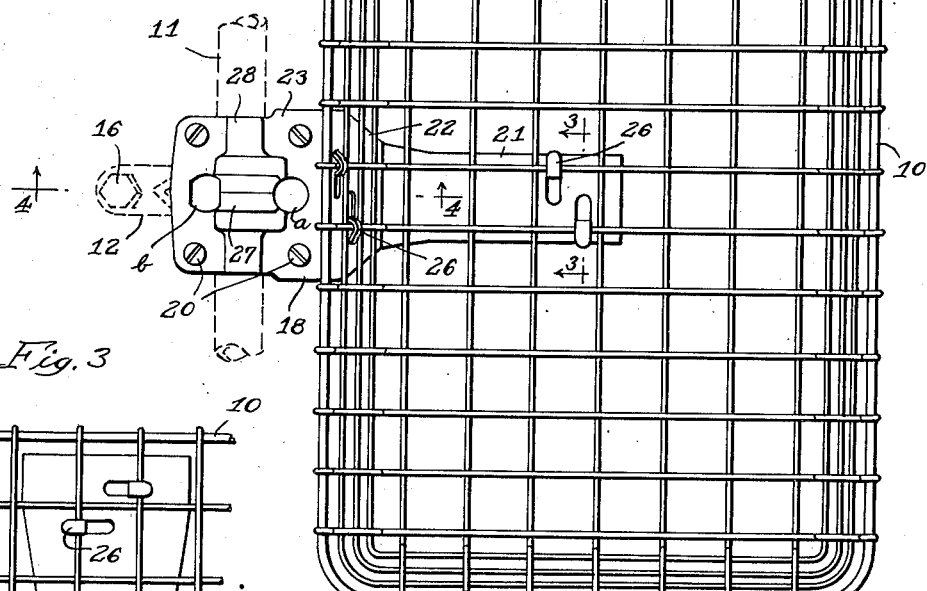
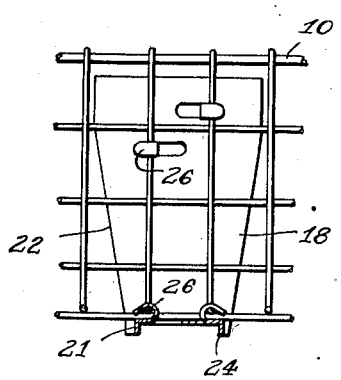

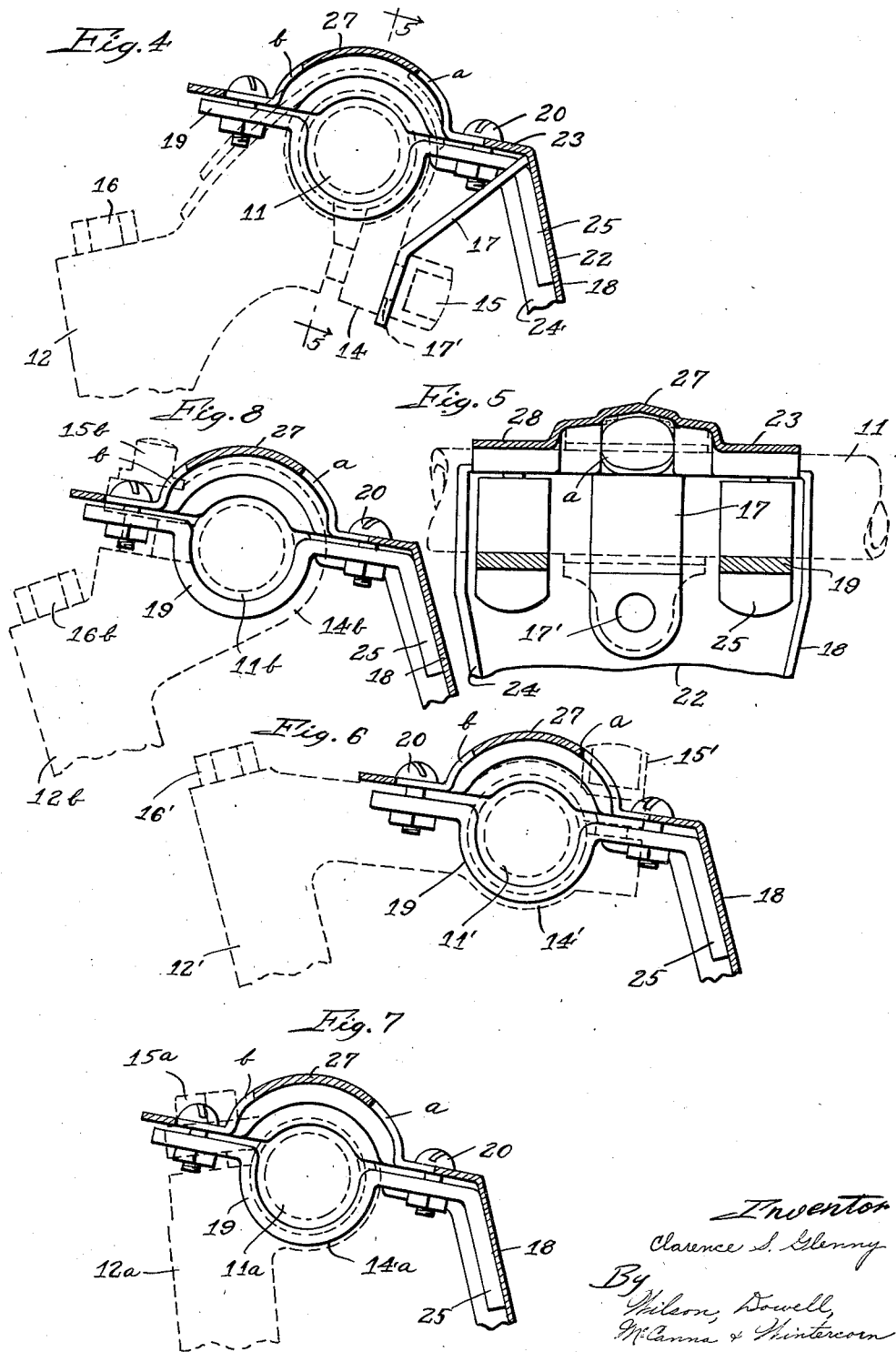

Patented May 11, 1937

2,079,851

UNITED STATES PATENT OFFICE 2,079,851

BICYCLE BASKET

Clarence S. Glenny, Rockford, Ill., assignor to The Washburn Company, Worcester, Mass., a corporation of Massachusetts Application February 17, 1936, Serial No. 64,201

3 Claims. (Cl. 224—36)

This invention relates to bicycle baskets.

The principal object of my invention is to provide a bicycle basket in which the supporting and fastening of the basket on the handle-bar is centralized in one bracket member extending from the middle of the basket to the middle of the handle-bar.

In accordance with my invention, the bracket is specially constructed for rigid attachment to the handle-bar directly on opposite sides of the usual clevis through which the handle-bar extends, and provision is made so that the bracket when clamped to the handle-bar will be held by the clevis against turning about the handle-bar as an axis.

The invention is illustrated in the accompanying drawings, in which—

Figure 1 is a side view of a bicycle basket embodying my invention shown mounted on the front of a bicycle;

Fig. 2 is a plan view of the basket;

Figs. 3 and 4 are sectional details taken on the lines 3—3 and 4—4 of Fig. 2;

Fig. 5 is a section at right angles to Fig. 4 on the line 5—5 thereof, and

Figs. 6, 7, and 8 are sectional details similar to Fig. 4, but showing the application of the bracket alone to different styles of clevises on other handle-bar stems where the brace shown in Fig. 1 cannot be used.

Similar reference numerals are applied to corresponding parts throughout the views.

Bicycle baskets of the kind illustrated are used for carrying packages, as is well known. Referring first to Figs. 1 to 5, the basket 10 is shown supported on the handle-bar 11 of a bicycle of which the handle-bar stem 12 and head 13 appear in Fig. 1. It is the general practice to provide a clevis on the handle-bar stem in which the handle-bar is clamped by the tightening of a bolt. In Figs. 1 and 4, the clevis is numbered 14 and its bolt 15. The type of stem shown in these figures has another bolt 16 extending lengthwise therein cooperating with an expander nut down in the head 13 to fasten the stem to the front wheel fork in a well known manner. However, the clevis bolt 15, in the form of my invention illustrated in Figs. 1 to 5, is the one which is utilized as one of the supports for the basket, it being entered through a hole 17' in a brace 17 to clamp the latter in place for abutment with the bracket 18, as clearly appears in Figs. 1 and 4, to prevent turning of the bracket about the handle-bar 11 as an axis. The bracket is clamped to the handle-bar by two straps 19 on opposite sides of the clevis 14, two bolts 20 being provided in connection with each of these straps passing through holes in the bracket and registering holes in the ends of the strap. The bracket 18 is stamped from a single piece of sheet metal to provide a bottom portion 21 fitting under the basket, an upwardly bent intermediate portion 22 fitting behind the basket, and a rearwardly bent top portion 23 for attachment to the handle-bar. The bottom and intermediate portions 21 and 22 and the front end of the top portion 23 are reenforced by longitudinal flanges 24 extending along the opposed lateral edges of the bracket. Thus, even though light sheet metal is employed, the desired strength and rigidity is obtained, and there is no likelihood of the bracket bending out of shape under normal or even slight overloading of the basket. Additional strength is obtained by having the front ends of the straps 19 extended, as at 25 (Figs. 4 and 5), and bent to fit in the angle formed by the junction of the portions 22 and 23 of the bracket 18. The bracket may be welded or otherwise suitably secured to the basket, depending upon what is best suited to the type of basket construction employed. In the present case where the basket is made of wire, I have illustrated lugs or ears 26 struck from the bottom and intermediate portions 21 and 22 and bent over adjacent wires on the bottom and back of the basket. The top portion 23 of the bracket is formed to provide a central raised portion 27 in which the top portion of the clevis 14 will be accommodated, the bracket spanning said clevis and resting on top of the handle-bar on opposite sides of the clevis. The bracket is also formed on both sides of the portion 27 to provide channels 28 to fit on top of the handle-bar, and, of course, since the straps 19 are below these channels, it follows that the handle-bar will be clamped in the channels when the bolts 20 are tightened.

In attaching the basket to the handle-bar, it is most convenient to fasten the brace 17 in place first and then fasten the bracket 18 by means of the clamp straps 19. It should be obvious that the straps 19 provide adequate and secure fastening, and since the straps are spaced to the extent illustrated in Fig. 5, the top portion 23 of the bracket being widened sufficiently for that purpose, the bracket will be held firmly enough to eliminate side-play. Inasmuch as the clamps 19 provide a frictional hold on the handle-bar, I have provided the brace 17 to support the bracket 18 in fixed relation to the handle-bar, that is, the brace holds the bracket against turning about the handle-bar as an axis. The basket therefore cannot sag under normal loading. The bracket, furthermore, is of channeled or flanged construction, as previously described, to have the requisite strength to eliminate likelihood of bending, even if the basket is at times overloaded. Further strength to resist bending of the bracket is afforded by the reenforcement derived from the bent extensions 25 of the strips 19, as previously explained. This centralized supporting and fastening bracket 18 is obviously of very simple and economical construction and one which can be put on or taken off the bicycle quickly and easily, and, when the basket is thereby attached to the bicycle it will give satisfactory service indefinitely. There is obviously nothing in the construction described which would tend to cause rattling or squeaking of the basket under the usual service conditions.

Attention is now called to the two holes a and b provided in the top portion 23 of the bracket at the front and back of the clevis socket 27. This subject matter is covered in a divisional application about to be filed. These holes permit attachment of the basket to all known makes of bicycles, other than the style disclosed in Fig. 1, requiring the use of the brace 17, regardless of the particular style of clevis which happens to be employed in connection with the handle-bar.

Thus, in Fig. 6, in which the handle-bar stem 12' is of a type similar to the stem 12 shown in Figs. 1 and 4 in the respect that it has a similar bolt 16' for fastening the same to the front fork, the bracket 18 is clamped to the handle-bar 11' by means of the straps 19 and bolts 20 so that the clevis 14' fits in the socket 27 on the top portion of the bracket, and the bracket is held against turning by reason of the projection of the head of the clevis bolt 15' into hole a. The hole a is, of course, provided at the right location and of the right size to accommodate the head of the bolt 15' with the bracket 18 disposed at the correct angle to support the basket in a horizontal portion, or substantially so. It will be observed that the head of the bolt 15' has abutment with the bracket at the rear side of the hole a to prevent turning of the bracket about the handle-bar 11' as an axis.

Referring to Fig. 7, in which still another handle-bar stem 12a is illustrated, the clevis 14a on this style has its bolt 15a serving the double purpose of clamping the handle-bar 11a and fastening the stem to the front fork in a manner similar to bolts 16 and 16', previously mentioned. In this case the hole b accommodates the head of the bolt 15a, as shown, and the bracket 18 is clamped to the handle-bar by means of the straps 19 and bolts 20, while the head of the bolt 15a serves by engagement with the bracket at the rear side of the hole b to prevent turning of the bracket about the handle-bar as an axis.

Referring to Fig. 8, still another style of handle-bar stem 12b is illustrated in connection with the handle-bar 11b, this one having a bolt 16b to serve the same purpose as the bolts 16 and 16', previously mentioned. The clevis 14b of this style happens to have its clamping bolt 15b so located that the bracket 18 would not be held at the right angle for horizontal disposition of the basket if the bracket were placed with the head of the bolt 15b abutting the same at the rear side of the hole a similarly to Fig. 7. Under these conditions, therefore, the bracket is placed so that a portion of the clevis itself projects into the hole b and has abutment at the back thereof, as illustrated.

I have found that the holes a and b, when made of the proper size and shape and properly spaced with respect to the socket 27 for the handle-bar clevis, will permit attachment of the basket to every known make of bicycle, so long as they have clevis bolts disposed in the different ways illustrated in Figs. 6 and 8. There is only one known make of bicycle employing a clevis of the type shown in Figs. 1 and 4 where the holes a and b cannot be used, and for that type the brace 17 cooperating with the bolt 15 of the clevis serves a similar purpose, as previously described.

It is believed the foregoing description conveys a good understanding of the objects and advantages of my invention. The appended claims have been drawn with a view to covering all legitimate modifications and adaptations.

I claim:

1. In a bicycle, a basket arranged to be supported on the handle-bar thereof, the bicycle having a handle-bar and a member supporting said bar on a clevis equipped with a fastening bolt the head of which projects for engagement by a wrench in the tightening thereof, clamping means carried on the basket and engaging the handle-bar on opposite sides of the clevis to attach the basket to said bar frictionally, and a brace member for said basket held in place under the head of the aforesaid bolt and serving positively to prevent rotation of the basket with the clamping means about the handle-bar as an axis.

2. A bicycle basket fastening and supporting means comprising in combination with a bicycle handle-bar and the holder therefor at the middle thereof, said holder having a handle-bar fastener element, a single bracket disposed at the middle of the back of a bicycle basket and adapted to support the same on the handle-bar, said bracket having a rearwardly extending attaching portion formed to fit over the top of said holder and rest on the handle-bar on opposite sides thereof, clamps extending under the handle-bar on opposite sides of the holder and having means fastening the same to the bottom of the attaching portion of the bracket so as to clamp the handle-bar therebetween, and a brace member constructed for detachable connection to the handle-bar holder by said fastener element and extending therefrom and having engagement with the attaching portion of said bracket in spaced relation to the handle-bar to support said bracket against rotation about the handle-bar as an axis.

3. As an article of manufacture, a sheet metal bracket for supporting a bicycle basket and fastening the same to a bicycle handle-bar of the type having a clamping clevis at its middle portion with a clamping bolt thereon the head of which projects for application of a wrench and is adapted to support a bicycle basket, said bracket comprising a body portion formed for connection to the basket and to provide a rearwardly extending attaching portion, the latter being of sufficient width to span the handle-bar clevis, said portion also being formed to provide a central socket to accommodate the upper portion of the clevis, and channels extending laterally in opposite directions from said socket to fit on top of the handle-bar on opposite sides of the clevis, a pair of straps under the channeled portions for engagement with the bottom of the handle-bar on opposite sides of the clevis, means for fastening said straps to the bracket whereby frictionally to clamp the handle-bar therebetween, and a sheet metal brace having a perforated end arranged to received and be held on the clevis by said bolt, said brace being arranged to extend between the bracket and the clevis to engage the bracket and prevent turning of the bracket about the handle-bar as an axis.

CLARENCE S. GLENNY.